US011221219B2

United States Patent
Lin et al.

(10) Patent No.: US 11,221,219 B2
(45) Date of Patent: Jan. 11, 2022

(54) SYSTEM FOR CALIBRATING MAP DATA CONFIGURED FOR MOBILE PLATFORM

(71) Applicant: TECO Electric & Machinery Co., Ltd., Taipei (TW)

(72) Inventors: Chia-Jen Lin, Taipei (TW); Shih-Chang Cheu, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 376 days.

(21) Appl. No.: 16/394,614

(22) Filed: Apr. 25, 2019

(65) Prior Publication Data
US 2020/0300631 A1 Sep. 24, 2020

(30) Foreign Application Priority Data
Mar. 19, 2019 (TW) .................................. 108109230

(51) Int. Cl.
*G06T 7/70* (2017.01)
*G01C 21/00* (2006.01)
*G05D 1/02* (2020.01)
*G05D 1/00* (2006.01)

(52) U.S. Cl.
CPC ......... *G01C 21/005* (2013.01); *G01C 21/383* (2020.08); *G01C 21/3848* (2020.08); *G05D 1/0227* (2013.01); *G05D 1/0274* (2013.01); *G06T 7/70* (2017.01); *G05D 1/0088* (2013.01); *G05D 1/0231* (2013.01); *G05D 1/0246* (2013.01); *G06T 2207/10004* (2013.01)

(58) Field of Classification Search
CPC ................ G01C 21/005; G01C 21/383; G01C 21/3848; G06T 7/70; G06T 2207/10004; G05D 1/0231; G05D 1/0088; G05D 1/0227; G05D 1/0246; G05D 1/0274
See application file for complete search history.

(56) References Cited

U.S. PATENT DOCUMENTS

| 10,571,926 B1 * | 2/2020 | Zhang ................. G05D 1/0219 |
| 2010/0138114 A1 * | 6/2010 | Yoshida .............. B60R 21/0132 701/46 |
| 2013/0138247 A1 * | 5/2013 | Gutmann ............. G05D 1/0274 700/253 |

(Continued)

*Primary Examiner* — Harry Y Oh
*Assistant Examiner* — Sohana Tanju Khayer
(74) *Attorney, Agent, or Firm* — Muncy, Geissler, Olds & Lowe, P.C.

(57) ABSTRACT

A system is applied for calibrating a map data configured for a mobile platform to generate a calibration map after an impact, and includes a map-generating module, a positioning module, an impact-detecting module, an image-analyzing module, a coordinate-reconstructing module and a map data-calibrating module. The map-generating module generates a global map with a first coordinate system. The positioning module positions a mobile platform before the impact. The impact detecting module generates a reconstructing signal after the impact upon the mobile platform is detected. The image-analyzing module searches and analyzes an image of a feature object. The coordinate-reconstructing module re-establishes a second coordinate system, and the map data-calibrating module calibrates the global map to generate the calibration map after the impact.

6 Claims, 10 Drawing Sheets

(56) References Cited

U.S. PATENT DOCUMENTS

| | | | |
|---|---|---|---|
| 2014/0195070 A1* | 7/2014 | Shimizu | G07C 5/0841 |
| | | | 701/1 |
| 2019/0066344 A1* | 2/2019 | Luo | G06K 9/6215 |
| 2019/0179333 A1* | 6/2019 | Noh | B25J 9/00 |
| 2021/0131822 A1* | 5/2021 | Artes | G05D 1/0225 |

* cited by examiner

SYSTEM FOR CALIBRATING MAP DATA CONFIGURED FOR MOBILE PLATFORM

This application claims the benefit of Taiwan Patent Application Serial No. 108109230, filed on Mar. 19, 2019, the subject matter of which is incorporated herein by reference.

BACKGROUND OF THE INVENTION

1. Field of the Invention

The invention relates to a calibration system, and more particularly to a system for calibrating map data configured for a mobile platform.

2. Description of the Prior Art

Positioning technology for robots or automatic guided vehicles (AGC) has appeared on a date early to the International Conference on Robotics and Automation in 1999.

With progress in technology, versatile robots and automatic guided vehicles become popular, and have been widely applied to serve as meal-delivering robots, service robots, sweeping robots and automated terminals in Qingdao, China.

However, while the robot or the automatic guided vehicle is in motion, contacts, collisions or impacts are inevitable, from which positioning of the robot or the automatic guided vehicle would be deviated and thus functionally affected, both in position determination and navigation.

SUMMARY OF THE INVENTION

As mentioned above, when the robots or the automatic guided vehicles are contacted or impacted, deviations in positioning and corresponding consequences would be inevitable. Accordingly, it is an object of the present invention to provide a system for calibrating map data configured for a mobile platform, that can resolve the aforementioned problems.

In the present invention, the system for calibrating map data configured for a mobile platform, applied to a mobile platform for generating a calibration map after a impact, includes a map-generating module, a positioning module, an impact-detecting module, an image-analyzing module, a coordinate-reconstructing module and a map data-calibrating module.

The map-generating module is to establish a global map corresponding to a navigation region having a recognizable feature object according to a first coordinate system, and the global map includes a feature-object coordinate of the recognizable feature object. The positioning module, electrically coupled with the map-generating module, is to position the mobile platform to obtain a pre-impact coordinate of the mobile platform. The impact-detecting module is to generate a map data-reconstructing signal upon when the impact is detected on the mobile platform.

The image-analyzing module, electrically coupled with the impact-detecting module, is to search the recognizable feature object upon when the map data-reconstructing signal is received, then to capture a recognizable image of the recognizable feature object, and to analyze the recognizable image for obtaining a relative coordinate relationship between the mobile platform and the feature-object coordinate. The coordinate-reconstructing module, electrically coupled with the map-generating module, the positioning module and the image-analyzing module, is to receive the feature-object coordinate, the pre-impact coordinate and the relative coordinate to further derive a post-impact coordinate of the mobile platform and then define a second coordinate system according to the post-impact coordinate. The map data-calibrating module, electrically coupled with the coordinate-reconstructing module and the map-generating module, is to utilize the second coordinate system to calibrate the global map for generating a calibration map.

In one embodiment of the present invention, the map-generating module includes an infrared scan unit for scanning the navigation region to establish the global map.

In one embodiment of the present invention, the impact-detecting module includes a vibration-detecting unit for detecting a vibration value of the mobile platform and determining that the mobile platform is impacted upon when the vibration value is greater than a critical vibration value.

In one embodiment of the present invention, the impact-detecting module includes an acceleration-detecting unit for detecting an acceleration value of the mobile platform and determining that the mobile platform is impacted upon when the acceleration value is greater than a critical acceleration value.

In one embodiment of the present invention, the impact-detecting module includes an inclination-detecting unit for detecting an inclination value of the mobile platform and determining that the mobile platform is impacted upon when the inclination value is greater than a critical inclination value.

In one embodiment of the present invention, the image-analyzing module includes an imaging ratio-recognizing unit for determining an imaging ratio of the recognizable image to further analyze the recognizable image for obtaining the relative coordinate relationship.

In one embodiment of the present invention, the image-analyzing module includes an imaging inclination-recognizing unit for determining an inclination of the recognizable image to further analyze the recognizable image for obtaining the relative coordinate relationship.

In one embodiment of the present invention, the map data-calibrating module calibrates the global map to generate the calibration map by utilizing a vector formed by the post-impact coordinate and the pre-impact coordinate and an angle formed by the second coordinate system and the first coordinate system.

As stated, the system for calibrating map data configured for a mobile platform provided by this invention utilizes the map-generating module, the positioning module, the impact-detecting module, the image-analyzing module, the coordinate-reconstructing module and the map data-calibrating module to derive the post-impact coordinate of the mobile platform after the impact, according to the pre-impact coordinate of the mobile platform, the recognizable feature-object coordinate and the relative coordinate relationship. Further, the second coordinate system is defined for facilitating the calibration from the global map after the impact to form a corresponding calibration map. Thereupon, various conventional problems caused by positioning errors resulted from the impact upon the mobile platform can be substantially resolved.

All these objects are achieved by the system for calibrating map data configured for a mobile platform described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a system for calibrating map data configured for a mobile platform. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
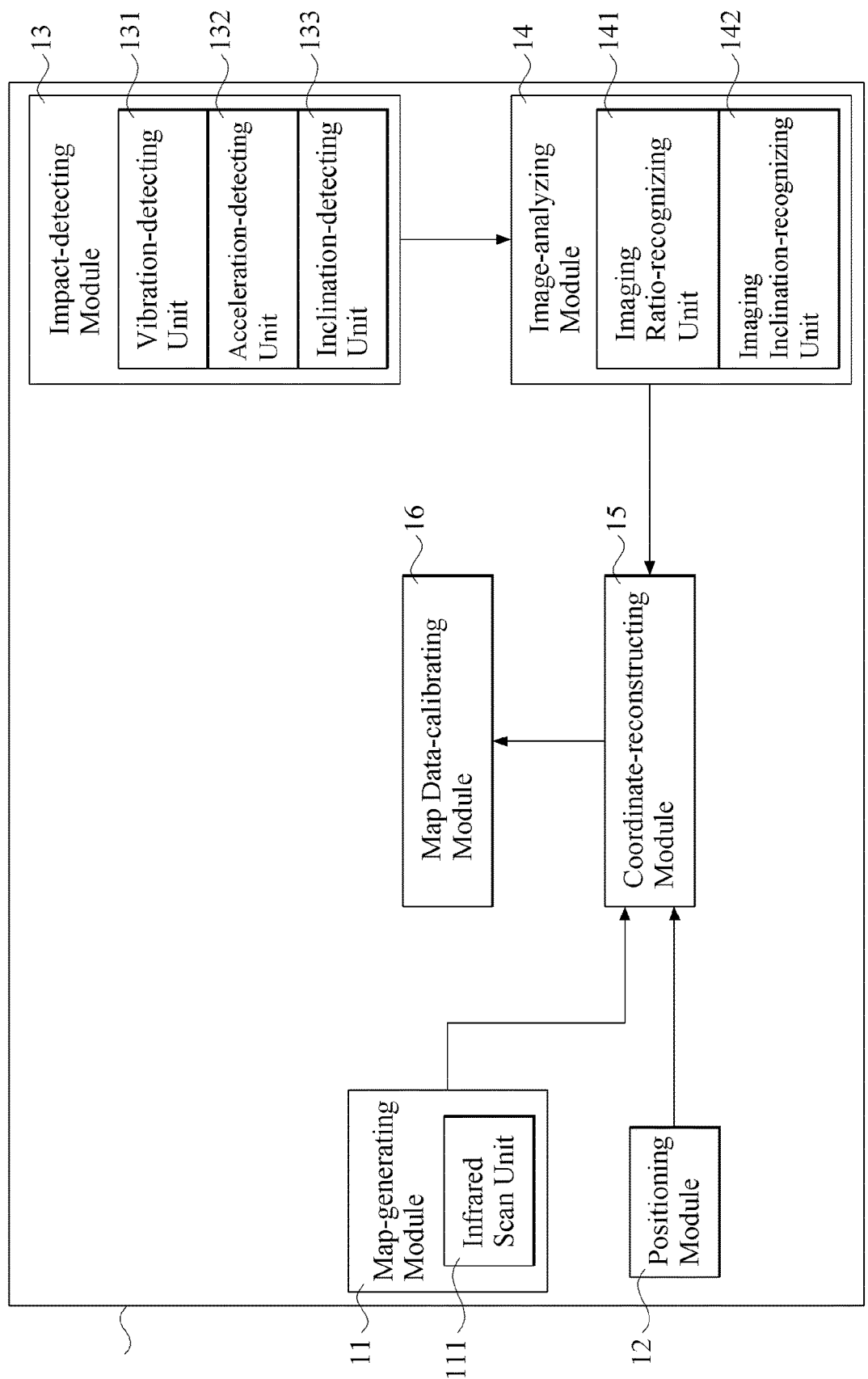
FIG. 1 is a schematic block view of a preferred embodiment of the system for calibrating map data configured for a mobile platform in accordance with the present invention.
Figure 2:
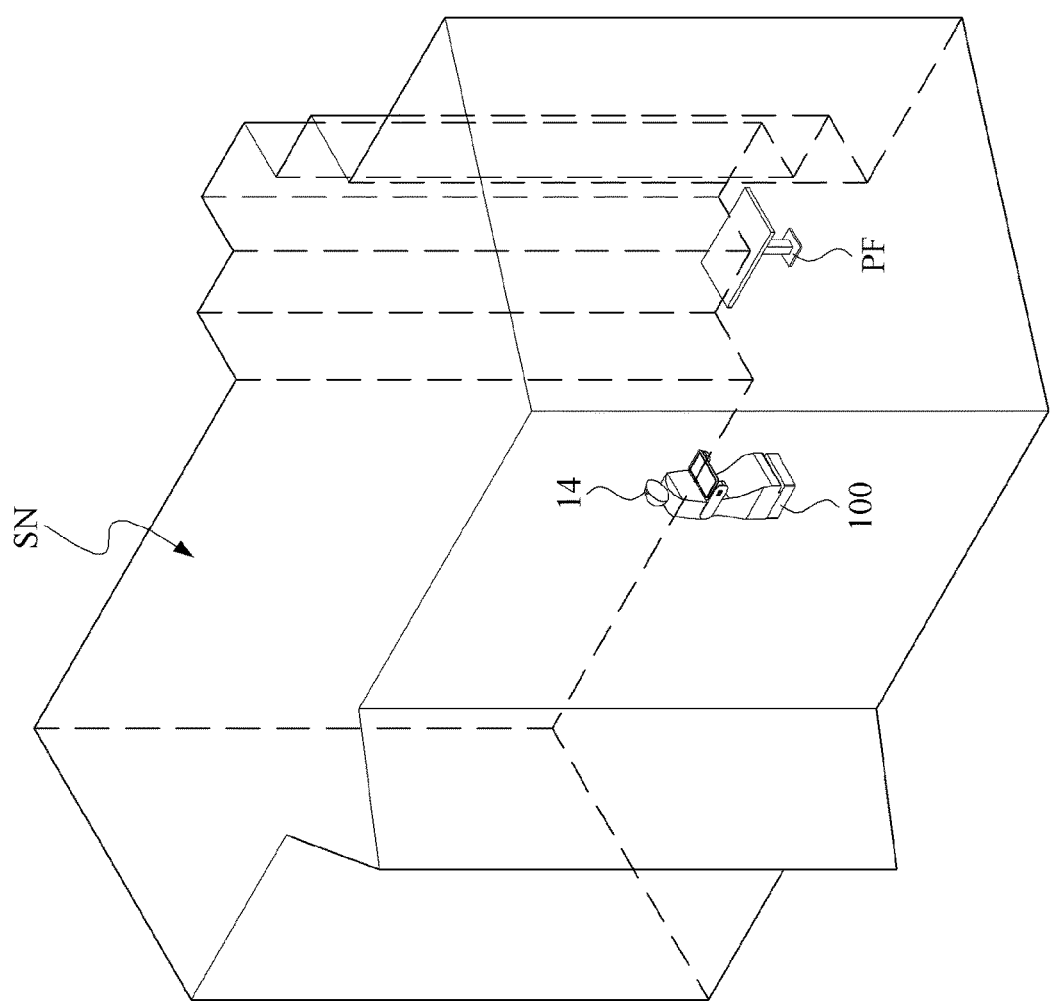
FIG. 2 is a schematic perspective view of the system for calibrating map data configured for a mobile platform of FIG. 1 located in a navigation region.
Figure 3:
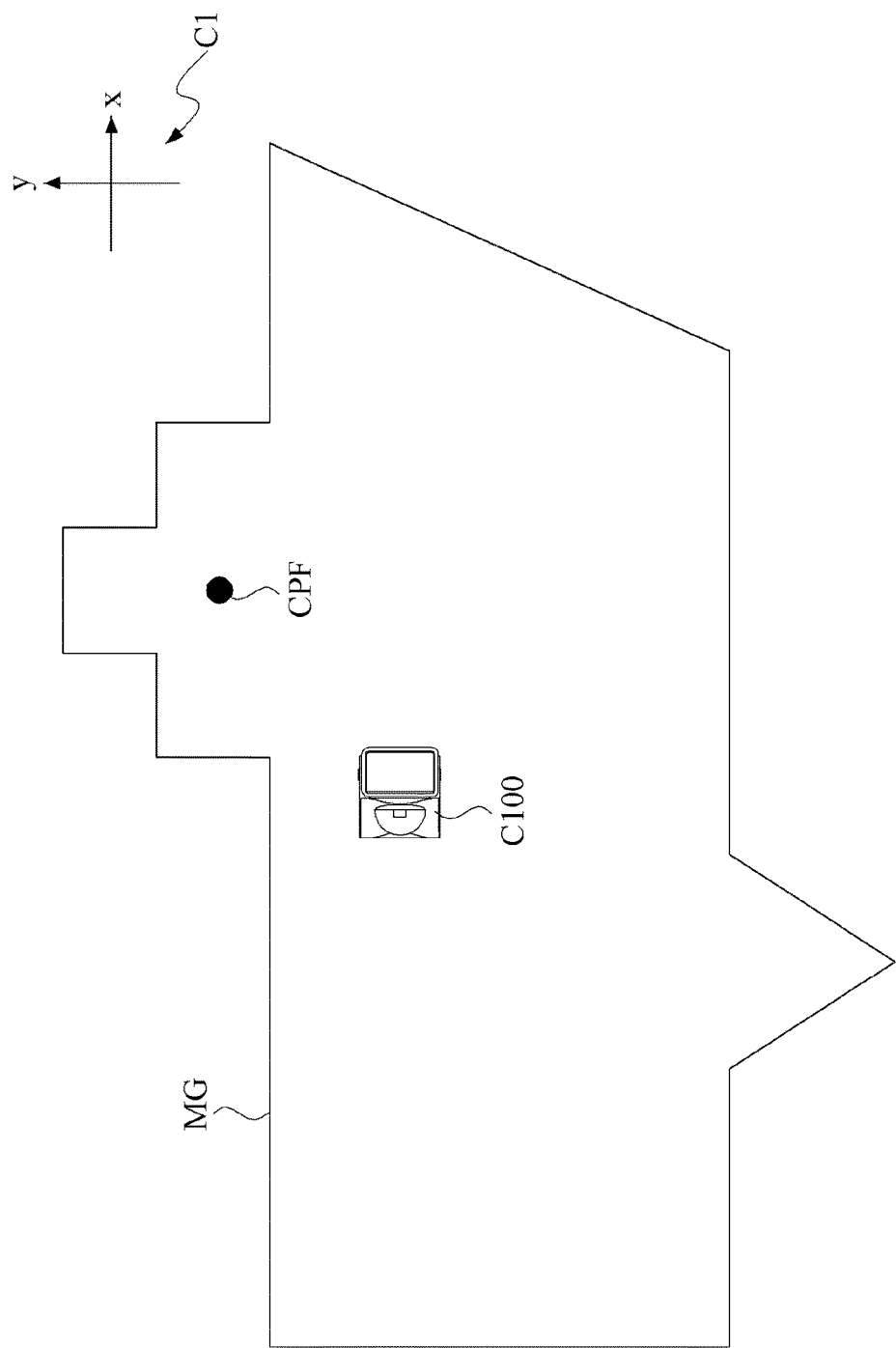
FIG. 3 is a schematic view showing a global map established by the system for calibrating map data configured for a mobile platform of FIG. 1.

Refer now to FIG. 1 to FIG. 3; where FIG. 1 is a schematic block view of a preferred embodiment of the system for calibrating map data configured for a mobile platform in accordance with the present invention, FIG. 2 is a schematic perspective view of the system for calibrating map data configured for a mobile platform of FIG. 1 located in a navigation region, and FIG. 3 is a schematic view showing a global map established by the system for calibrating map data configured for a mobile platform of FIG. 1. As shown, the system for calibrating map data configured for a mobile platform 1, applied to a mobile platform 100 for calibrating the mobile platform 100 after being hit, collided or impacted, includes a map-generating module 11, a positioning module 12, an impact-detecting module 13, an image-analyzing module 14, a coordinate-reconstructing module 15 and a map data-calibrating module 16.

The mobile platform 100 is disposed within a navigation region SN having a recognizable feature object PF. In this embodiment, the navigation region SN can be, but not limited to, a region in a cafeteria, and the recognizable feature object PF can be, but not limited to, a specific table.

When the mobile platform 100 is located in the navigation region SN, the map-generating module 11 is to establish a global map MG with respect to the navigation region SN in a first coordinate system C1. The global map MG includes a feature-object coordinate CPF corresponding to the recognizable feature object PF. In this embodiment, the map-generating module 11 includes an infrared scan unit 111. While the mobile platform 100 moves within the navigation region SN, the infrared scan unit 111 is applied to scan the navigation region SN so as to construct the global map MG.

The positioning module 12, electrically coupled with the map-generating module 11, is to obtain a pre-impact coordinate C100 of the mobile platform 100 before being impacted.

The impact-detecting module 13 is to detect if or not the mobile platform 100 is impacted, and then to generate a corresponding map data-reconstructing signal if the detection is positive. In this embodiment, the impact-detecting module 13 can include, but not limited to, a vibration-detecting unit 131, an acceleration-detecting unit 132 and an inclination-detecting unit 133.

The image-analyzing module 14, electrically coupled with the impact-detecting module 13, is to search the recognizable feature object PF upon receiving the map data-reconstructing signal, then to capture a recognizable image from the recognizable feature object, and to analyze the recognizable image so as to obtain a relative coordinate relationship between the mobile platform 100 and the feature-object coordinate CPF.

The coordinate-reconstructing module 15, electrically coupled with the map-generating module 11, the positioning module 12 and the image-analyzing module 14, is to derive a post-impact coordinate of the mobile platform 100 after being impacted, based on the feature-object coordinate, the pre-impact coordinate and the relative coordinate relationship. The post-impact coordinate is then used to define a second coordinate system.

The map data-calibrating module 16, electrically coupled with the coordinate-reconstructing module 15 and the map-generating module 11, is to apply the second coordinate system to calibrate the global map MG so as further to generate a calibration map MCG.

Figure 4:
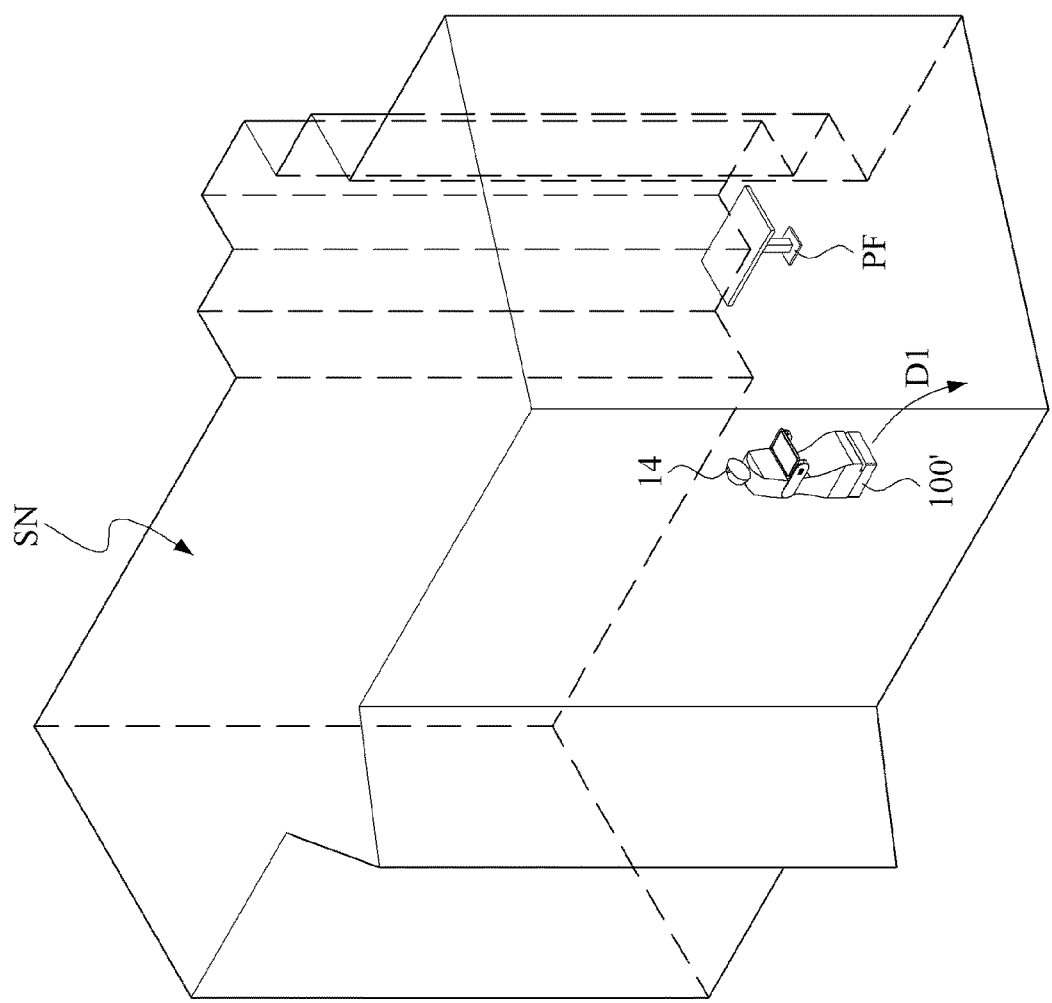
FIG. 4 is another state of FIG. 2 showing the mobile platform has been impacted.
Figure 5:
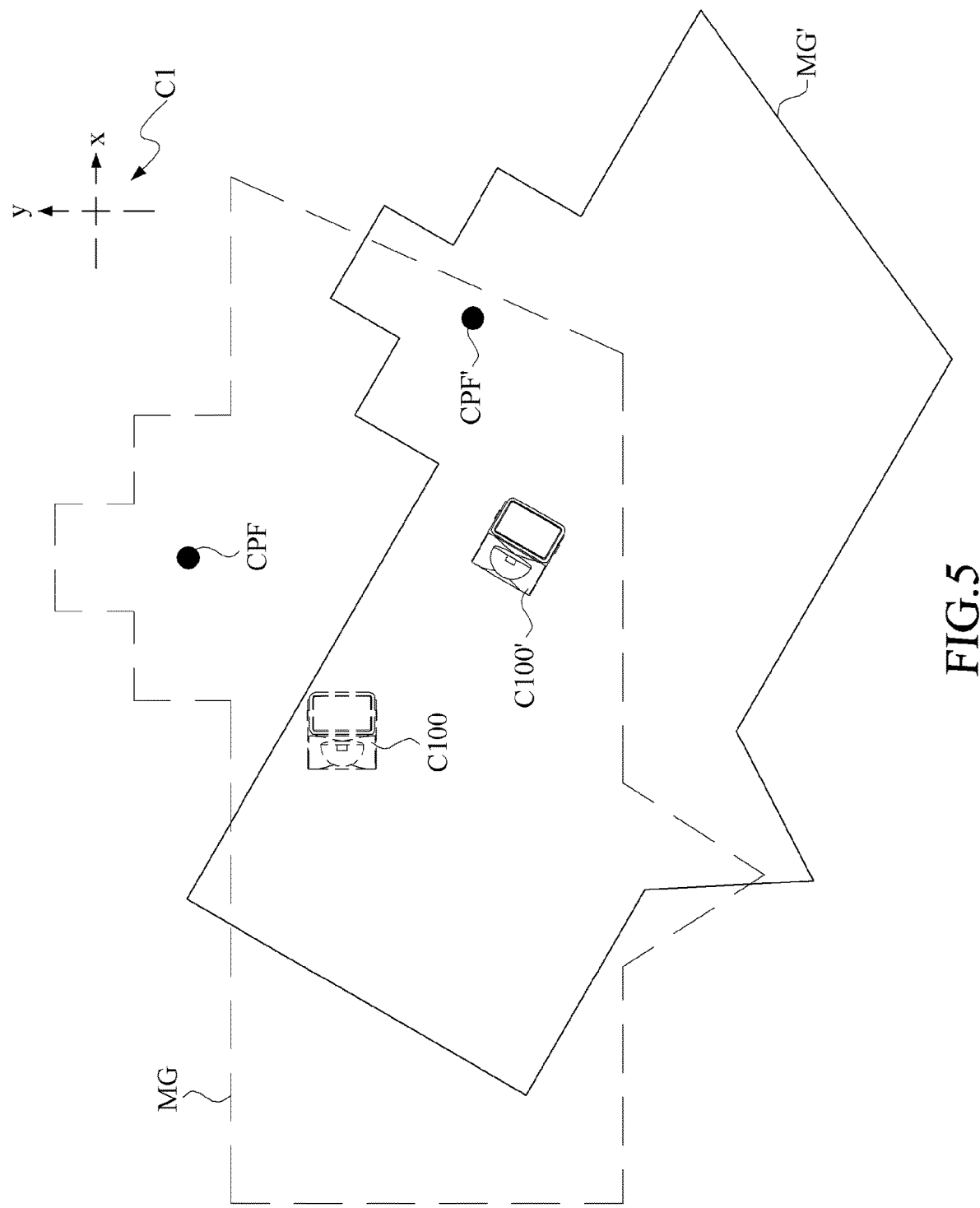
FIG. 5 is a schematic view of a post-impact map after the mobile platform has been impacted.
Figure 6:
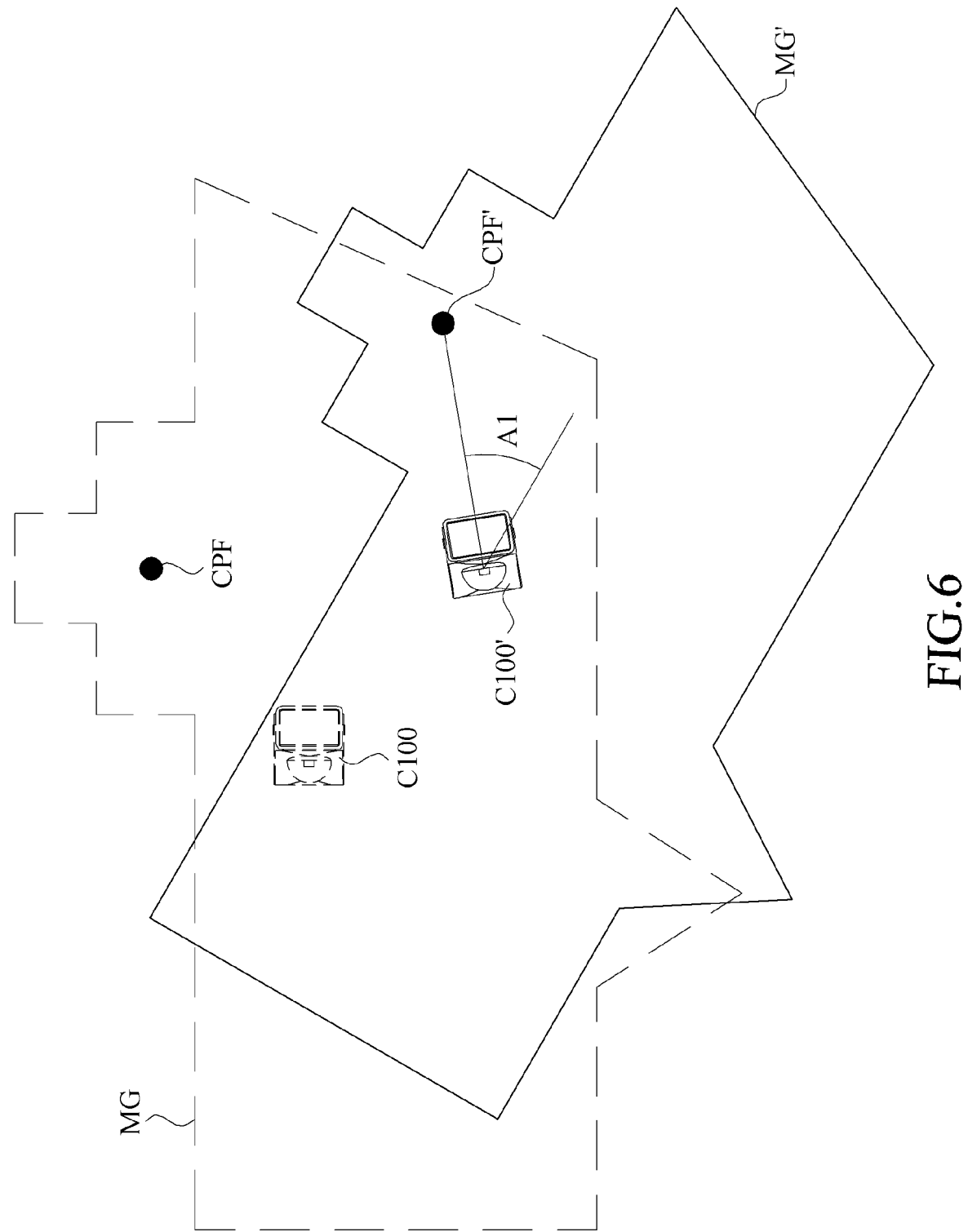
FIG. 6 shows schematically that the mobile platform searches a feature-object coordinate on the global map after an impact.
Figure 7:
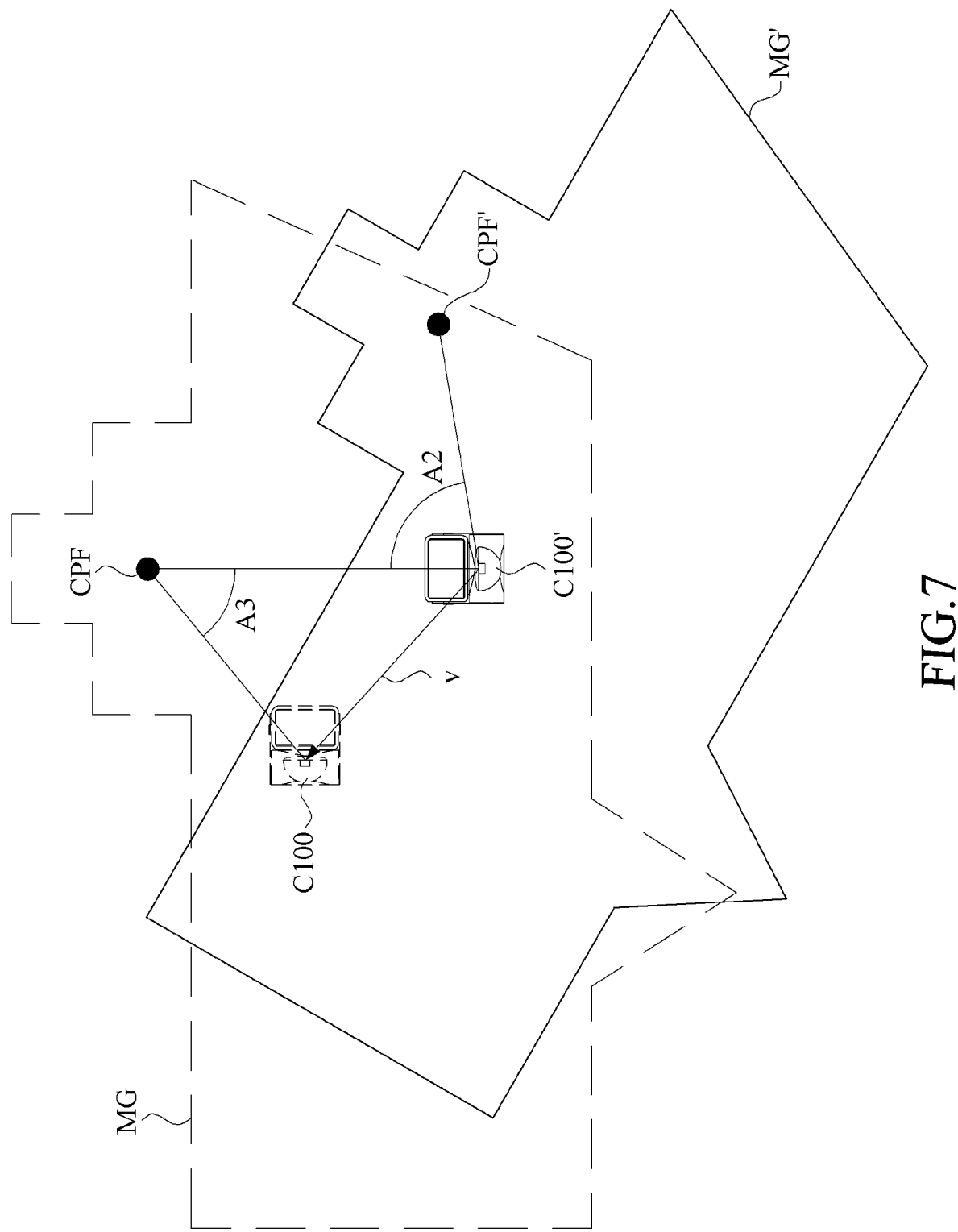
FIG. 7 shows schematically that the mobile platform searches a recognizable feature object in the navigation region.
Figure 8:
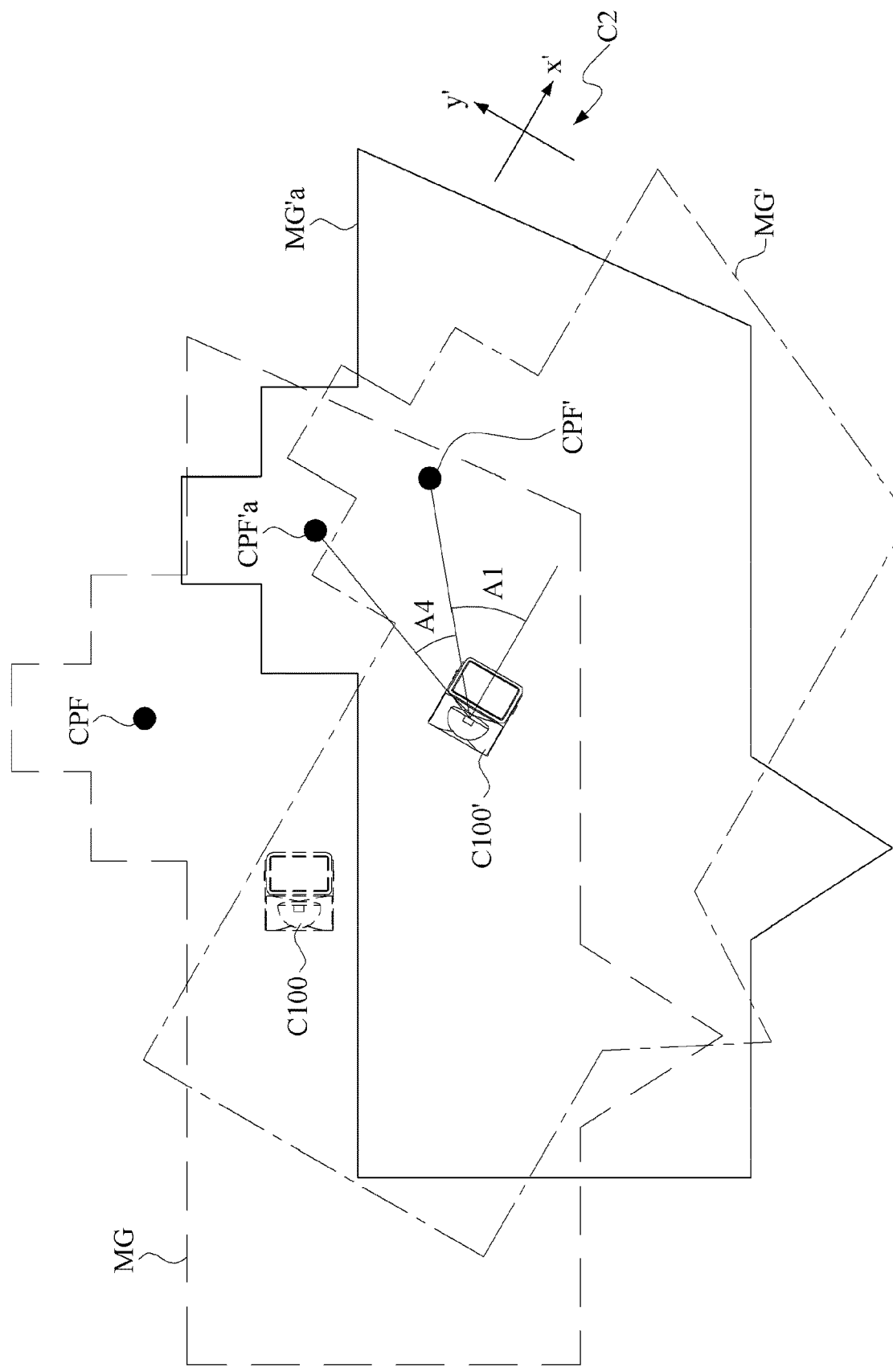
FIG. 8 is a schematic view of a calibrated global map of FIG. 1.
Figure 9:
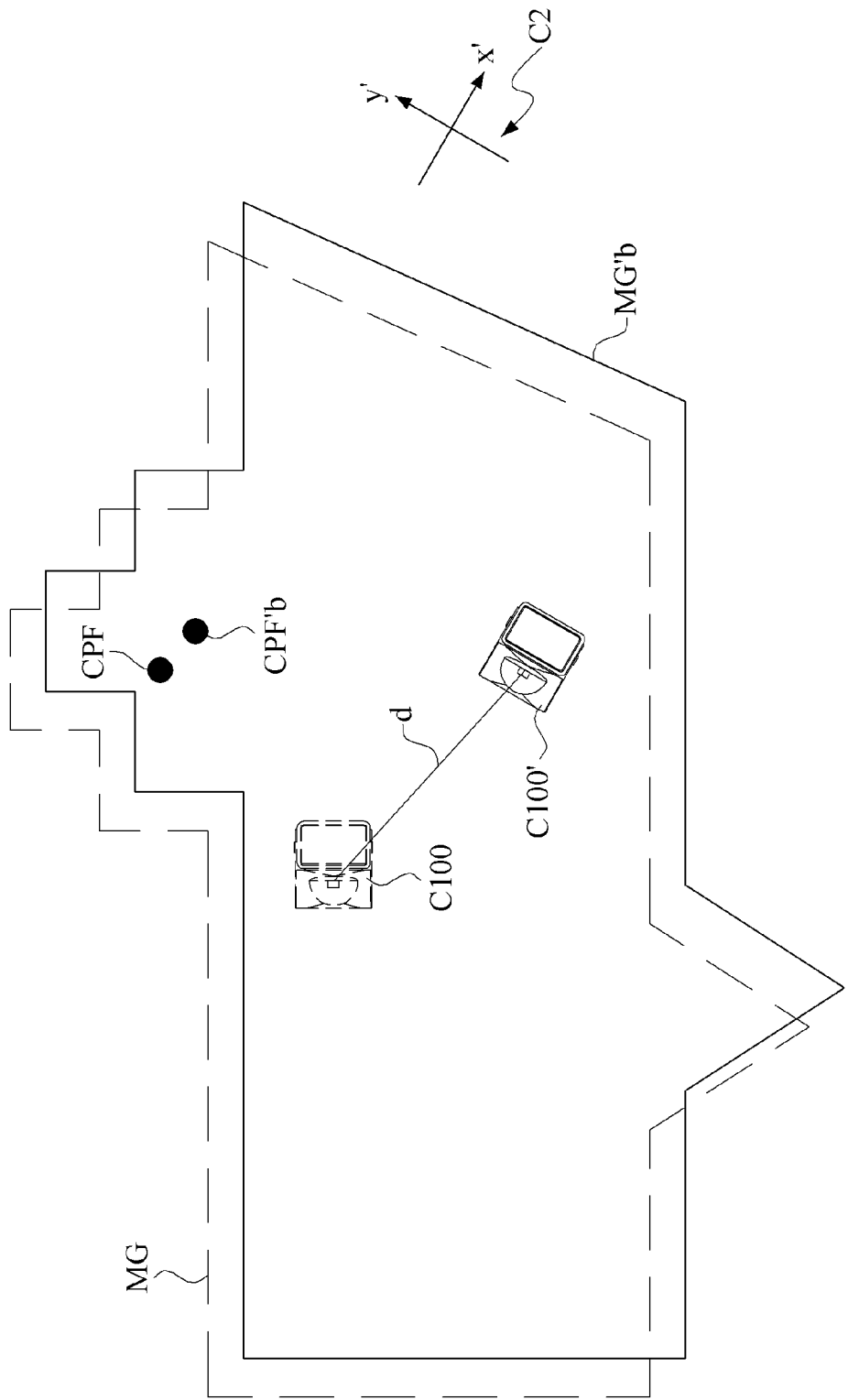
FIG. 9 is another schematic view of the calibrated global map of FIG. 1.
Figure 10:
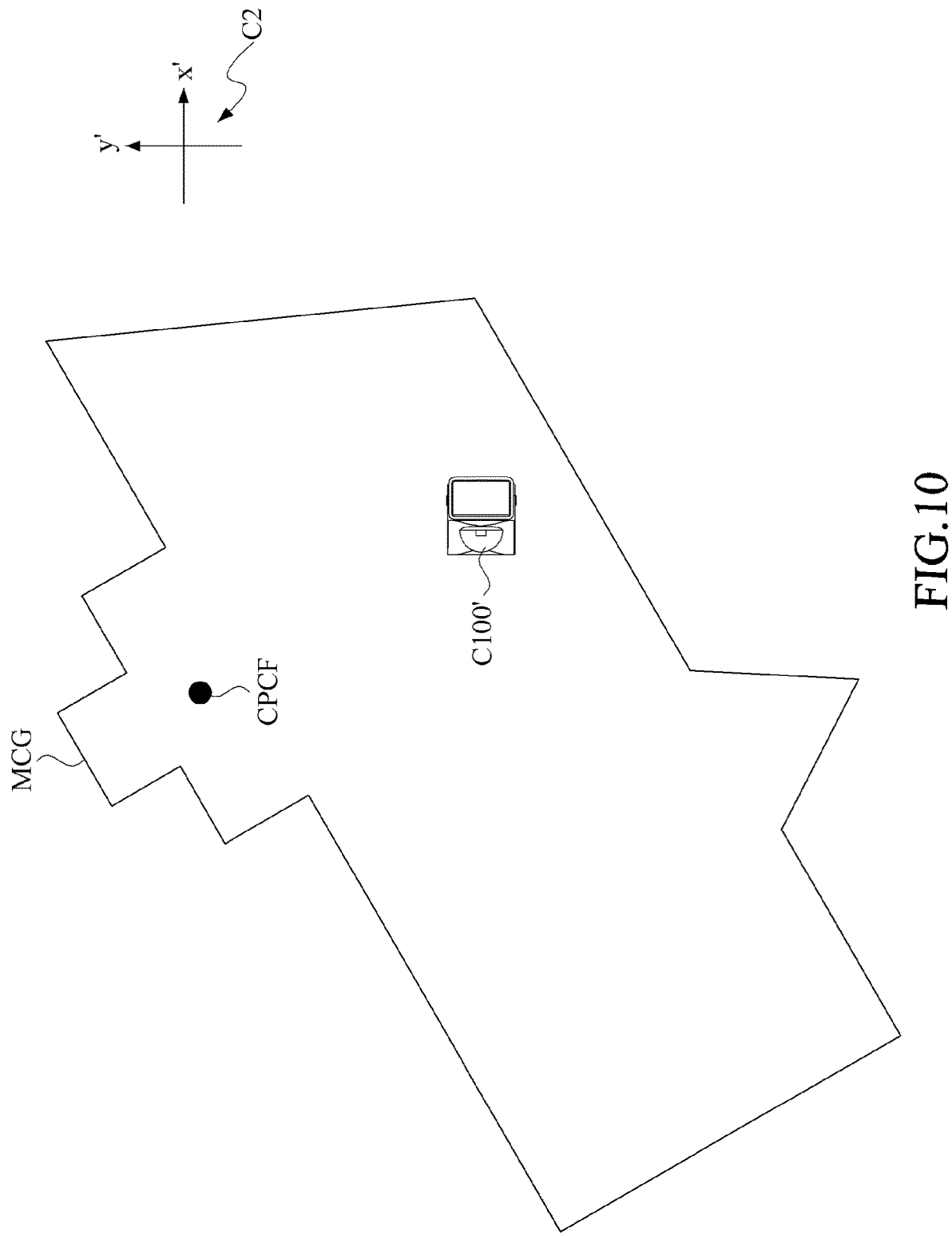
FIG. 10 is a schematic view showing a calibration map formed from the calibrated global map of FIG. 1.

Then, refer also to FIG. 4 through FIG. 10; where FIG. 4 is another state of FIG. 2 showing the mobile platform has been impacted, FIG. 5 is a schematic view of a post-impact map after the mobile platform has been impacted, FIG. 6 shows schematically that the mobile platform searches a feature-object coordinate on the global map after an impact, FIG. 7 shows schematically that the mobile platform searches a recognizable feature object in the navigation region, FIG. 8 is a schematic view of a calibrated global map of FIG. 1, FIG. 9 is another schematic view of the calibrated global map of FIG. 1, and FIG. 10 is a schematic view showing a calibration map formed from the calibrated global map of FIG. 1.

As shown, after being impacted, the mobile platform 100 slides in a deviation direction D1 to generate a corresponding displacement and a corresponding angular deviation. For a more concise explanation, the mobile platform after being impacted is labeled by 100', different to the mobile platform 100 before being impacted.

Before the mobile platform 100 is impacted, the global map MG is established in accordance with the navigation region SN. That is, the recognizable feature object PF in the navigation region SN would be mapped to the feature-object coordinate CPF on the global map MG.

After the mobile platform 100 is impacted to displace a distance or to turn an angle for forming the mobile platform 100', the global map MG is also transformed into a global map MG' (after the impact). Before the map is calibrated, the mobile platform 100' would think that the global map MG' is mapped to the navigation region SN. Thus, the mobile platform 100' would be faulted to believe that the recognizable feature object PF still stays at a front right position; i.e., a feature-object coordinate CPF' on the global map MG'.

However, since the global map MG' is not mapped with the navigation region SN, so the feature-object coordinate CPF' on the global map MG' would not tell the position of the recognizable feature object PF within the navigation region SN. Actually, the position PF of the recognizable feature object is now shifted to the feature-object coordinate CPF on the global map MG. As shown, the recognizable feature object PF is now shifted to a rear left side with respect to the mobile platform 100'.

After the mobile platform 100 is impacted to displace a distance or to turn an angle for forming the mobile platform 100', the impact-detecting module 13 would detect the impact upon the mobile platform 100 to further generate a corresponding map data-reconstructing signal. The impact-detecting module 13 can make judgment by evaluating a feedback current value from a control loop. Upon an impact, the instant feedback current value would be deviated largely away from a regular feedback current value during normal operations, and thereby an impact to the mobile platform 100 can be realized. In addition, the vibration-detecting unit 131, the acceleration-detecting unit 132 and the inclination-detecting unit 133 of the impact-detecting module 13 are all used to detect if or not the mobile platform 100 is impacted.

The vibration-detecting unit 131 is used to detect a vibration value of the mobile platform 100. When a detected vibration value is greater than a preset critical vibration value, it implies that the mobile platform 100 encounters an abnormal shock or vibration. Thereupon, it is then determined that the mobile platform 100 is collided or impacted by a foreign object, and so the aforesaid map data-reconstructing signal is issued accordingly. In the present invention, the vibration-detecting unit 131 can be a vibration gauge or any element or chip that can detect vibrations.

The acceleration-detecting unit 132 is used to detect an acceleration value of the mobile platform 100. When a detected acceleration value is greater than a preset critical acceleration value, it implies that the mobile platform 100 encounters an abnormal acceleration. Thereupon, it is determined that the mobile platform 100 is collided or impacted by a foreign object, and so the aforesaid map data-reconstructing signal is issued accordingly. In the present invention, the acceleration-detecting unit 132 can be an acceleration gauge or any element or chip that can detect accelerations.

Similarly, the inclination-detecting unit 133 is used to detect an inclination value of the mobile platform 100. When a detected inclination value is greater than a preset critical inclination value, it implies that the mobile platform 100 encounters an abnormal inclination. Thereupon, it is determined that the mobile platform 100 is collided or impacted by a foreign object, and so the aforesaid map data-reconstructing signal is issued accordingly. In the present invention, the inclination-detecting unit 133 can be an angle gauge or any element or chip that can detect inclinations.

Practically, the acceleration-detecting unit 132 or the inclination-detecting unit 133 can be a triaxial sensor (i.e., a gyroscope) that utilizes different piezoelectric features at three axes (X, Y, Z) to detect accelerations or inclinations of the target object. As the object encounters an displacement or an angular deviation, the corresponding acceleration or inclination value can be directly obtained.

Since the positioning module 12 would position the mobile platform 100 constantly, the system 1 for calibrating map data configured for the mobile platform can have the pre-impact coordinate C100 of the mobile platform 100. As soon as the image-analyzing module 14 receives a map data-reconstructing signal, a recognizable feature object PF would be searched. As shown in FIG. 6, the mobile platform 100' would be rotated to the feature-object coordinate CPF', based on the global map MG' now incoherent with the navigation region SN after the impact, and a corresponding rotation angle A1 is recorded.

Since the coordinate cannot tell the rotation, a post-impact coordinate C100' on the global map MG' corresponding to the displacement in the deviation direction D1 and the angular deviation of the mobile platform 100' is labeled to a top-view diagram having the mobile platform 100', so that the direction of the image-analyzing module 14 and the rotation of the mobile platform 100' can be depicted more concisely. It shall be explained that, at this instant time, a real coordinate value of the post-impact coordinate C100' is yet to be computed.

Then, the image-analyzing module 14 on the mobile platform 100' would begin to search a recognizable feature object PF; i.e., feature-object coordinate CPF on the global map MG in this embodiment. After the recognizable feature object PF is located, the corresponding rotation angle A2 is recorded. As shown in FIG. 7, after the image-analyzing module 14 has located the recognizable feature object PF, a recognizable image of the recognizable feature object PF is captured and then analyzed to obtain a relative coordinate relationship between the mobile platform 100' and the feature-object coordinate.

In this embodiment, the image-analyzing module 14 includes an imaging ratio-recognizing unit 141 and an imaging inclination-recognizing unit 142. The imaging ratio-recognizing unit 141 is to determine an imaging ratio of the recognizable image of the recognizable feature object PF, such that the recognizable image of the recognizable feature object PF can be analyzed to obtain the relative coordinate relationship. The imaging inclination-recognizing unit 142 is to determine an inclination of the recognizable image of the recognizable feature object PF, such that the recognizable image of the recognizable feature object PF can be analyzed to obtain the relative coordinate relationship.

In this embodiment, the imaging ratio-recognizing unit 141 can be a proportion scale or a means for triangulation. Thereupon, the relative coordinate relationship can be derived by analyzing the recognizable image of the recognizable feature object PF. On the other hand, the imaging inclination-recognizing unit 142 can utilize the keystone correction (i.e., the trapezoidal correction) or the trigonometric functions to analyze the recognizable image of the recognizable feature object PF so as further to obtain the relative coordinate relationship.

Practically, the image-analyzing module 14 would firstly capture and realize the proportionality of the recognizable image, and then inspect profile and rotation features of the recognizable image. Thereupon, the relative coordinate relationship can be derived. Generally speaking, the aforesaid processes may involve a matrix calculation, and sometimes the gray-scale correction might be introduced to facilitate the calculation.

In addition, the coordinate-reconstructing module 15 is to receive the feature-object coordinate CPF of the recognizable feature object PF, the pre-impact coordinate C100 of the mobile platform 100, and the relative coordinate relationship, so that, thereby, a corresponding post-impact coordinate C100' of the mobile platform 100' can be computed. Namely, the real position of the mobile platform 100' can be located. Further, a second coordinate system C2 to update the first coordinate system C1 can be defined. As shown, an angle A3 is formed by realizing the pre-impact coordinate C100 of the mobile platform 100, the feature-object coordinate CPF of the recognizable feature object PF, and the relative coordinate relationship.

After finishing the aforesaid steps, the mobile platform 100' would resume its angling according to the rotation angles A1 and A2. Then, the map data-calibrating module 16 would use the second coordinate system C2 to calibrate the global map MG' after the impact. Firstly, the map data-calibrating module 16 would derive an angle A4 equal to the difference between the angle A2 and the angle A3. Then, the global map MG' is rotated by the angle A4 to form another global map MG'a, and also the feature-object coordinate CPF' is rotated by the same angle A4 to form another feature-object coordinate CPF'a, as shown in FIG. 8. It shall be explained that the angle A4 (i.e., the difference between the angles A2 and A3) is the aforesaid angular deviation between the mobile platform 100' after the impact and the mobile platform 100 before the impact, and also the rotation angle of the second coordinate system C2 with respect to the first coordinate system C1.

Then, the map data-calibrating module 16 would calculate and derive a vector v and a distance d between the post-impact coordinate C100' of the mobile platform 100' and the pre-impact coordinate C100 of the mobile platform 100, and then the global map MG'a would be displaced according to the vector v so as to form another global map MG'b. Also, the feature-object coordinate CPF'a is displaced according to the vector v so as to form another feature-object coordinate PF'b, as shown in FIG. 9. It shall be explained that the vector v stands for the angular deviation between the mobile platform 100' after the impact and the mobile platform 100 before the impact, while the distance d stands for the deviated distance between the mobile platform 100' after the impact and the mobile platform 100 before the impact.

By shifting the global map MG'a the distance d according to the vector v, the global map MG'b would overlap the global map MG, the feature-object coordinate CPF'b would overlap the feature-object coordinate CPF, and the global map MG would cohere with the navigation region SN. Thus, at this time, the calibration of the data-calibrating module 16 to calibrate the global map MG' after the impact by utilizing the second coordinate system C2 is completed.

Based on the second coordinate system C2 for the mobile platform 100' after the impact, the data-calibrating module 16 is to calibrate the global map MG' after the impact to form a calibration map MCG, as shown in FIG. 10. In addition, a feature-object coordinate CPCF on the calibration map MCG is in correspondence with the real position of the recognizable feature object PF within the navigation region SN.

In summary, the system for calibrating map data configured for a mobile platform provided by this invention utilizes the map-generating module, the positioning module, the impact-detecting module, the image-analyzing module, the coordinate-reconstructing module and the map data-calibrating module to derive the post-impact coordinate of the mobile platform after the impact, according to the pre-impact coordinate of the mobile platform, the recognizable feature-object coordinate and the relative coordinate relationship. Further, the second coordinate system is defined for facilitating the calibration from the global map after the impact to form a corresponding calibration map for the navigation region.

In comparison with the prior art, the system for calibrating map data configured for a mobile platform provided by the present invention would erase the position deviation from the mobile platform after the impact, and thus possible positioning errors upon the navigation system on the robot or the automatic guided vehicle to downgrade related system functions would be avoided.

While the present invention has been particularly shown and described with reference to a preferred embodiment, it will be understood by those skilled in the art that various changes in form and detail may be without departing from the spirit and scope of the present invention.

What is claimed is:

1. A system for calibrating map data, applied to a mobile platform moving within a navigation region for generating a calibrated map after an impact, comprising:
   a map-generating module, having an infrared scan unit to scan the navigation region to construct a global map corresponding to the navigation region having a recognizable feature object according to a first coordinate system, the global map including a feature-object coordinate of the recognizable feature object;
   a positioning module, electrically coupled with the map-generating module, positioning the mobile platform to obtain a pre-impact coordinate of the mobile platform;
   an impact-detecting module, having at least one of a vibration-detecting unit, an acceleration-detecting unit and an inclination-detecting unit to generate a map data-reconstructing signal upon when the impact is detected on the mobile platform by the at least one of the vibration-detecting unit, the acceleration-detecting unit and the inclination-detecting unit;
   an image-analyzing module, electrically coupled with the impact-detecting module, configured for searching the recognizable feature object upon when the map data-reconstructing signal is received, and then for capturing a recognizable image of the recognizable feature object, further having at least one of an imaging ratio-recognizing unit and an imaging inclination-recognizing unit to analyze the recognizable image for obtaining a relative coordinate relationship between the mobile platform and the feature-object coordinate;
   a coordinate-reconstructing module, electrically coupled with the map-generating module, the positioning module and the image-analyzing module, configured for receiving the feature-object coordinate, the pre-impact coordinate and the relative coordinate relationship to further derive a post-impact coordinate of the mobile platform and then define a second coordinate system according to the post-impact coordinate; and
   a map data-calibrating module, electrically coupled with the coordinate-reconstructing module and the map-generating module, configured for utilizing the second coordinate system to calibrate the global map for generating the calibrated map, wherein the map data-calibrating module calibrates the global map to generate the calibrated map by utilizing a vector formed by the post-impact coordinate and the pre-impact coordinate and an angle formed by the second coordinate system and the first coordinate system.

2. The system for calibrating map data of claim 1, wherein the vibration-detecting unit is configured for detecting a vibration value of the mobile platform and determining that the mobile platform is impacted upon when the vibration value is greater than a critical vibration value.

3. The system for calibrating map data of claim 1, wherein the acceleration-detecting unit is configured for detecting an acceleration value of the mobile platform and determining that the mobile platform is impacted upon when the acceleration value is greater than a critical acceleration value.

4. The system for calibrating map data of claim 1, wherein the inclination-detecting unit is configured for detecting an inclination value of the mobile platform and determining that the mobile platform is impacted upon when the inclination value is greater than a critical inclination value.

5. The system for calibrating map data of claim 1, wherein the imaging ratio-recognizing unit is configured for determining an imaging ratio of the recognizable image to further analyze the recognizable image for obtaining the relative coordinate relationship.

6. The system for calibrating map data of claim 1, wherein the imaging inclination-recognizing unit is configured for determining an inclination of the recognizable image to further analyze the recognizable image for obtaining the relative coordinate relationship.

* * * * *